United States Patent
Fahmi et al.

(10) Patent No.: US 7,912,266 B2
(45) Date of Patent: Mar. 22, 2011

(54) SYSTEM AND METHOD FOR ROBUST SEGMENTATION OF TUBULAR STRUCTURES IN 2D AND 3D IMAGES

(75) Inventors: Rachid Fahmi, Louisville, KY (US); Matthias Wolf, Coatesville, PA (US); Anna Jerebko, West Chester, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 456 days.

(21) Appl. No.: 12/183,433

(22) Filed: Jul. 31, 2008

(65) Prior Publication Data

US 2009/0041315 A1 Feb. 12, 2009

Related U.S. Application Data

(60) Provisional application No. 60/954,410, filed on Aug. 7, 2007.

(51) Int. Cl.
*G06K 9/00* (2006.01)
*G06K 9/34* (2006.01)

(52) U.S. Cl. ............................... 382/128; 382/173

(58) Field of Classification Search .......... 382/128, 382/129, 130, 131, 132, 133, 134, 164, 171, 382/173, 177, 179; 600/141, 407, 425, 427; 601/119, 121, 122; 602/63, 901; 128/920, 128/922

See application file for complete search history.

(56) References Cited

U.S. PATENT DOCUMENTS

| 6,272,366 | B1 * | 8/2001 | Vining | 600/407 |
| 7,043,290 | B2 * | 5/2006 | Young et al. | 600/416 |
| 7,602,970 | B2 * | 10/2009 | Florin et al. | 382/173 |

FOREIGN PATENT DOCUMENTS

| WO | WO 2004086310 A1 | 10/2004 |
| WO | WO 2005069223 A2 | 7/2005 |

OTHER PUBLICATIONS

Cohen, et al.; "Global Minimum for Active Contour Models: A Minimal Path Approach", Published in International Journal of Computer Vision, vol. 4, No. 1, Aug. 1997 (pp. 57-78); Magazine.

(Continued)

*Primary Examiner* — Abolfazl Tabatabai
(74) *Attorney, Agent, or Firm* — Peter Withstandley (57) ABSTRACT

A method for segmenting tubular structures in medical images includes providing at least a start point and an end point in a digital image volume, minimizing an action surface $U_0(p)$ which, at each image point p, corresponds to a minimal energy integrated along a path that starts at start point $p_0$ and ends at p, sliding back on the minimal action surface from an end point to the start point to find a minimal path connecting the terminal points, initializing a level set function with points on the minimal path, and evolving the level set function to find a surface of a structure about the minimal path, wherein the level set function is constrained to be close to a signed distance function and wherein the level set function is prevented from growing wider than a predetermined diameter R, wherein the surface about the minimal path defines a tubular structure.

21 Claims, 6 Drawing Sheets

OTHER PUBLICATIONS

Hanssen, et al. "Nerves-Level Sets for Interacctive 3D Segmentation of Nerve Channels", Published in Biomedical Imaging: Macro to Nano, 2004. IEEE International Symposium on Arlington, VA, USA, Apr. 15, 2004 (pp. 201-204); Magazine.

Van Bemmel, et al., "Level-Set-Based Artery-Vein Separation in Blood Pool Agent CE-MR Angiograms", Published in IEEE Transactions on Medical Imaging, IEEE Service Center, vol. 22, No. 10, Oct. 1, 2003 (pp. 1224-1234); Magazine.

Manniesing, et al., "Skeletonization for Re-initialization in Level Set Based Vascular Tree Segmentation" Published in Medical Imaging 2004: Image Processing Proceedings, vol. 5370, Feb. 16, 2004 (pp. 506-514); Magazine.

Li, et al., "Vessels as 4D Curves: Global Minimal 40 Paths to Extract 3D Tubular Surfaces" Published in Computer Vision and Pattern Recognition Workshop, 2006 Conference on New York, IEEE, Jun. 17, 2006 (pp. 1-8); Magazine.

Deschamps, et al., "Fast extraction of minimal paths in 3D images and applications to virtual endoscopy" Published in Medical Image Analysis, Oxford University Press, vol. 5, Jan. 1, 2001 (pp. 281-299); Magazine.

Kirbas, et al., "Vessel Extraction Techniques and Algorithms: A Survey", Published in Bioinformatics and Bioengineering. Proceedings. Third IEEE Symposium, Mar. 10, 2003 (pp. 238-245); Magazine.

International Search Report of International Application No. PCT/US2008/009470 dated Aug. 31, 2009.

Li et al., "Level Set Evolution Without Re-Initialization: A New Variational Formulation", Proceedings of the 2005 IEEE Computer Society Conference on Computer Vision and Pattern Recognition (CVPR'05), pp. 430-436, vol. 1.

Cohen et al., "Global Minimum for Active Contour Models: A Minimal Path Approach", International Journal of Computer Vision, vol. 24(1), Aug. 1997, pp. 1-26.

Sethian, "A Fast Marching Level Set Method for Monotonically Advancing Fronts", Proceedings of the National Academy of Sciences, vol. 93(4), pp. 1-17, 1996.

* cited by examiner

SYSTEM AND METHOD FOR ROBUST SEGMENTATION OF TUBULAR STRUCTURES IN 2D AND 3D IMAGES

CROSS REFERENCE TO RELATED UNITED STATES APPLICATIONS

This application claims priority from "ROBUST SEGMENTATION OF TUBULAR STRUCTURES IN 2D AND 3D IMAGES", U.S. Provisional Application No. 60/954,410 of Fahmi, et al., filed Aug. 7, 2007, the contents of which are herein incorporated by reference in their entireties.

TECHNICAL FIELD

This disclosure is directed to the segmentation of tubular structures in digital medical images.

DISCUSSION OF THE RELATED ART

The segmentation of vascular objects, such as blood vessels, human pulmonary tree, cerebral vasculature, aorta, etc., is important for various clinical tasks including surgical planning and diagnosis. Segmentation of blood vessels is a challenging task due to poor contrast, noise, as well as to their branching and changing geometry. The task is even more challenging when a vessel surface along a particular path through branching vasculature is of interest. Various approaches have been proposed for vessel segmentation. Some of these approaches used an iterative method to alternately find the center axis and vessel surface. Starting from an initial axis estimate, the 3D data were re-sampled perpendicular to the axis, and within the re-sampled 2D slices, vessel points were located at maximum gradient positions. The corresponding results may be less accurate due to the sensitivity of local gradients to noise and the chosen threshold. Other approaches use deformable models, either discrete or continuous, to segment vessel surfaces from different image modalities. One method for reconstructing vessel surfaces from 3D MRA images uses a deformable model that employs a tubular coordinate system. To avoid self intersection problems, vertex merging was incorporated into the coordinate system. Another approach uses a B-spline based explicit deformable model to extract a vessel segment.

Tubular structures have also been identified by the response of derivatives and Gaussian filters convolved with the image. For example, another approach identified blood vessels as 3D curvilinear structures using multi-scale Hessian-based filters. The filter response can be used to visualize the vessels through iso-surface extraction or maximum intensity projection. However, the filter response may lead to incorrect results in case of a noisy intensity map.

The level set formalism, with or without shape priors, has also been adopted in other vessel segmentation techniques. Level set methods implicitly represent the evolving surface as the zero level set of a higher dimensional scalar valued function. Such representation leads to an accurate handling of topological changes such as breaking and merging.

These techniques, however, are sensitive to the initial placement of the vessel surface. A bad initialization may result in several leakages out of the vessel boundaries. To cope with the issue of leaks, many researchers have proposed to incorporate shape priors into the segmentation framework. Several other studies made use of minimal path techniques to extract the surface of the vessel between two user-defined end-points. This type of technique searches a path between two or more user-defined end points that minimizes a total cost along the path. The cost, also known as the potential, is computed from image data, and is a useful factor in obtaining a path that lies within the vessel boundary. One example of this technique is a method to extract the vessel path as well as the vessel surface in an augmented 4D space. The additional non-spatial dimension that is incorporated into the search space corresponds to the vessel width.

SUMMARY OF THE INVENTION

Exemplary embodiments of the invention as described herein generally include methods and systems for robust, interactive, semi-automatic extraction of the surface between two or more user-supplied end points for tubular- or vessel-like structures. A method according to an embodiment of the invention exploits features of minimal path techniques, such as global minima, fast computation, and ease of incorporating user input, to extract the shortest path between the user supplied end-points. This path is the global minimizer of an active contour model's energy along all possible paths joining the end-points. The extracted path is subsequently used to segment the vessel surface along the path. Some or all of the points forming the extracted path are used to automatically initialize a level set-based segmentation technique. This technique is only applied on the image portion consisting of the voxels that lie within a radius R from the extracted path. This step is rendered very fast because only a portion of the image along the path and within a radius R is considered. The width constraint also helps in avoiding any leakages that usually form at the root of the vessel, at bifurcations and branching areas, or close to the fast part of the evolving front. The radius R can be set by the user to a value that is proportional to the maximum width of the vessel segment along the path. To cope with any further leaks that may occur in the case of large variations of the vessel width between the user-supplied end-points, the points located at the neck of the potential leak areas are frozen during the course of evolution of the level set function. The points to be frozen can be determined from a few clicks by the user around the leak region. The potential of an algorithm according to an embodiment of the invention is demonstrated on several 2D/3D synthetic and medical images. A typical application of a method according to an embodiment of the invention is the segmentation of vessels in medical images.

According to an aspect of the invention, there is provided a method for segmenting tubular structures in medical images, comprising providing a 3-dimensional (3D) medical image volume, said image volume comprising a plurality of intensities associated with a 3D grid of points, providing at least 2 terminal points in said image, including a start point and an end point, minimizing an action surface $U_0(p)$ which, at each image point p, corresponds to a minimal energy integrated along a path that starts at start point $p_0$ and ends at p, sliding back on said minimal action surface from $(p_1, U_0(p_1))$ to $(p_0, U_0(p_0))$ wherein $p_1$ is an end point to find a minimal path connecting said terminal points, initializing a level set function with points on said minimal path, and evolving said level set function to find a surface of a structure about said minimal path, wherein said level set function is constrained to be close to a signed distance function and wherein said level set function is prevented from growing wider than a predetermined diameter R, wherein said surface about said minimal path defines a tubular structure.

According to a further aspect of the invention, the surface $U_0(p)$ is defined by $$U_0(p) = \inf_{C \in A_{p_0 p_1}} \{E(C)\},$$

wherein $$E(C) = \int_0^1 (w + P(C(s))) ds$$

is a real scalar function defined on a space of all curves C connecting said terminal points, wherein s is an arc length along a path, w is a predetermined positive real constant and P is an image feature attraction potential function.

According to a further aspect of the invention, the method includes extracting an edge map from said image, wherein said potential function P at each point p in said image is an increasing function of the shortest Euclidean distance to a point in said edge map.

According to a further aspect of the invention, minimizing an action surface $U_0(p)$ comprises solving an Eikonal equation $\|\nabla U_0\| = \tilde{P}$ with $U_0(p_0) = 0$ at the start point wherein $\tilde{P}(p) = w + P(p)$.

According to a further aspect of the invention, the Eikonal equation is solved by a fast marching method wherein U at a given image point (i,j,k) is given as the solution of $$(u - \min\{U_{i-1,j,k}, U_{i+1,j,k}\})^2 + (u - \min\{U_{i,j-1,k}, U_{i,j+1,k}\})^2 + (u - \min\{U_{i,j,k-1}, U_{i,j,k+1}\})^2 = \tilde{P}^2(i,j,k)$$

where $u = U_{i,j,k}$.

According to a further aspect of the invention, sliding back on said minimal action surface comprises numerically solving $$\frac{\partial C}{\partial \sigma} = -\nabla U_0,$$

$C(0) = p_1$, wherein C starts at an end point $p_1$ and $\sigma$ is an arc length parameter.

According to a further aspect of the invention, evolving said level set function comprises solving $$\frac{\partial \phi}{\partial t} = \alpha_1 div\left(\left(1 - \frac{1}{|\nabla \phi|}\right)\nabla \phi\right) + \alpha_2 \delta(\phi) div\left(g \frac{\nabla \phi}{|\nabla \phi|}\right) + \alpha_3 g \delta(\phi)$$

in a region of said image about said minimal path, wherein $\phi$ is said level set function whose zero level is a moving front C defined by $C(t) = \{(x,y) | \phi(x,y) = 0\}$, g is an edge indicator function defined on the image I as $$g = \frac{1}{1 + |\nabla G_\sigma * I|^2},$$

with $G_\sigma$ being a Gaussian kernal with standard deviation $\sigma$, $\delta()$ is a Dirac delta function, and $\alpha_1, \alpha_2 > 0$ and $\alpha_3$ are constants, wherein said first term on the right hand side of the equation for $$\frac{\partial \phi}{\partial t}$$

penalizes a deviation of $\phi$ from a signed distance function during evolution of $\phi$.

According to a further aspect of the invention, the method includes, if an evolving front leaks outside of a region of interest, providing one or more points that specify a region in which a speed of said level set evolution is zero.

According to a further aspect of the invention, the end points are provided by a user.

According to a further aspect of the invention, the end points are automatically provided.

According to another aspect of the invention, there is provided a program storage device readable by a computer, tangibly embodying a program of instructions executable by the computer to perform the method steps for segmenting tubular structures in medical images.

DETAILED DESCRIPTION OF EXEMPLARY EMBODIMENTS

Exemplary embodiments of the invention as described herein generally include systems and methods for segmenting tubular structures in digital medical images. Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

As used herein, the term "image" refers to multi-dimensional data composed of discrete image elements (e.g., pixels for 2-D images and voxels for 3-D images). The image may be, for example, a medical image of a subject collected by computer tomography, magnetic resonance imaging, ultrasound, or any other medical imaging system known to one of skill in the art. The image may also be provided from non-medical contexts, such as, for example, remote sensing systems, electron microscopy, etc. Although an image can be thought of as a function from $R^3$ to R, the methods of the inventions are not limited to such images, and can be applied to images of any dimension, e.g., a 2-D picture or a 3-D volume. For a 2- or 3-dimensional image, the domain of the image is typically a 2- or 3-dimensional rectangular array, wherein each pixel or voxel can be addressed with reference to a set of 2 or 3 mutually orthogonal axes. The terms "digital"

and "digitized" as used herein will refer to images or volumes, as appropriate, in a digital or digitized format acquired via a digital acquisition system or via conversion from an analog image.

Methods

According to an embodiment of the invention, a user provides start and end points inside a vessel as well as the expected maximum diameter of the vessel. An algorithm according to an embodiment of the invention will then find a path (center line) that connects these 2 points and segment the surface of the vessel between both points. An algorithm according to an embodiment of the invention uses a minimal path technique to extract the shortest path between the user-supplied points. This path is the global minimizer of an active contour model's energy along all possible paths joining the end-points. Subsequently, the surface of interest is extracted using an edge-based level set segmentation approach. To prevent leakage into adjacent tissues, a diameter constraint is used that constrains the moving front from growing wider than the predefined diameter. Some or all of the points along the extracted path(s) are automatically used as initialization seeds for the evolving level set function. To cope with any further leaks that may occur in the case of large variations of the vessel width between the user-supplied end-points, a freezing mechanism is designed to prevent the moving front from leaking into undesired areas. The regions to be frozen can be determined from a few clicks by the user.

The mathematical background of the techniques used herein, such as the minimal path method and the level set evolution model adopted for surface extraction, will now be reviewed.

An embodiment of the invention adapts a minimal path technique proposed by L. Cohen and R. Kimmel, "Global Minimum for Active Contour Models: A Minimal Path Approach", Int. J. of Computer Vision, Vol. 24(1), August 1997, the contents of which are herein incorporated by reference in their entirety. This technique detects the global minimum of an active contour model's energy between two points.

The energy functional along the paths joining two end-points is a real mapping from the space of all paths connecting the given end-points, and combines smoothing terms and an image feature attraction term, P, referred to as a potential or cost function. This energy is defined as:

$$E: A_{p_0 p_1} \rightarrow R,$$

$$C \rightarrow E(C) = \int_0^1 \left( w \left\| \frac{\partial C}{\partial s}(s) \right\|^2 + P(C(s)) \right) ds = \int_0^1 \tilde{P}(C(s)) ds,$$

where, $\tilde{P}(p) = w + P(p)$, with regularization parameter w being a real positive constant. The set $A_{p_0 p_1}$ is the space of all curves C connecting the given points and satisfying the boundary conditions $C(0)=p_0$ and $C(1)=p_1$. The parameter s represents the arc-length on a path. According to an embodiment of the invention, the arc length parameter s is normalized to values $s \in [0,1]$, which results in the norm of the tangent vector $\|\partial C/\partial s\|$ having a value of unity. The regularization term that is multiplied by the constant w measures the length of the curve. The potential P is associated with external forces, and is computed as a function of the image data according to the desired goal. If, for example, one wants the curves to be attracted by edges, the potential should depend on the image gradient.

Given a potential P, a minimal path technique according to an embodiment of the invention finds the curve $C \in A_{p_0 p_1}$ that globally minimizes E(C) between the user-supplied end points. In other words, one seeks a path joining the user-supplied end points along which the integral of $\tilde{P}=w+P$ is minimal. To do so, one first searches for the surface of minimal action $U_0$ that starts at $p_0 C(0)$. At each point p of the image plane, the value of this surface $U_0$ corresponds to the minimal energy integrated along a path that starts at $p_0$ and ends at p:

$$U_0(p) = \inf_{C(1)=p} \left\{ \int_C \tilde{P} ds \right\} = \inf_{C \in A_{p_0 p_1}} \{E(C)\},$$

where s is the arc length parameter.

The values of the map $U_0(\ )$, everywhere in the image domain, are defined by solving the following Eikonal equation:

$$\|\nabla U_0\| = \tilde{P}$$

with $U_0(p_0)=0$ at the start point. The solution U is obtained as a solution of the Eikonal equation.

According to an embodiment of the invention, a Fast Marching Method (FMM) proposed by J. A. Sethian, "A Fast Marching Level Set Method for Monotonically Advancing Fronts", Proc. Nat. Acad. Sci., Vol. 93(4), pp. 1591-1595, 1996, the contents of which are herein incorporated by reference in their entirety, was used to solve this equation. The FMM converges in a finite number of steps by propagating the information in an up-wind direction. The solution at a given grid point (i,j,k) is given as the solution of the following equation:

$$(u-\min\{U_{i-1,j,k}, U_{i+1,j,k}\})^2 + (u-\min\{U_{i,j-1,k}, U_{i,j+1,k}\})^2 + (u-\min\{U_{i,j,k-1}, U_{i,j,k+1}\})^2 = \tilde{P}^2(i,j,k)$$

where $u=U_{i,j,k}$.

Once the minimal action $U_0(\ )$ is determined, the minimal path between the user-supplied end-points is deduced by back sliding on the surface $U_0$ from $(p_1, U_0(p_1))$ to $(p_0, U_0 p_0))$. The surface of minimal action $U_0$ has a convex like behavior in the sense that starting from any point $(q, U_0(q))$ on the surface, and following the gradient descent direction one will always converge to p. It means that $U_0$ has only one local minimum that is of course the global minimum and is reached at $p_0$ with value zero. Given the point $p_1$, the path of minimal action connecting $p_0$ (the minimal point in $U_0$, $U(p_0)=0$) and $p_1$ is the curve $\tilde{C}(\sigma)$ starting at $p_1$ and following the opposite gradient direction on $U_0$:

$$\frac{\partial \tilde{C}}{\partial \sigma} = -\nabla U_0, \tilde{C}(0) = p_1,$$

where σ is an arc length parameter. Then the solution C(s) is obtained by arc length parameterization of $\tilde{C}(-\sigma)$ with $C(0)=p_0$ and $C(1)=p_1$. The minimal path can be obtained this way since $\nabla U$ is tangent to the geodesic. The gradient of U is therefore orthogonal to the wavefronts since these are its level sets. This can be achieved by numerically solving the differential equation. One exemplary, non-limiting scheme for numerically solving a differential equation is a $4^{th}$ order Runge-Kutta method. Using back propagation following the gradient of U, once the surface U is available, the minimal path between the start point $p_0$ and any other point p can be obtained without additional computation.

Different potential functions P were tested according to various embodiments of the invention. For the results presented below, the potential P is chosen as an increasing function of the distance to the image edge map. An edge detection operator, such as one based on the Canny edge detection algorithm, is used to extract the edge map from the image data, and the potential at each point p is defined as a function of the shortest Euclidean distance to an edge point. Such a potential has many useful features, such as avoiding node concentration at high gradient points.

The regularization parameter w affects the geometry of the minimizing path and was chosen specifically for each application. According to an embodiment of the invention, an exemplary, non-limiting value is of the order of 0.1.

One exemplary, non-limiting method of segmenting the tubular object surface is by using level sets. According to an embodiment of the invention, a level set formulation proposed by C. Li, C. Xu, C. Gui, and M. Fox, "Level set evolution without re-initialization: a new variational formulation", CVPR 2005, pp. 430-436, vol. 1, the contents of which are herein incorporated by reference in their entirety, was used for the extraction of the surface that lies between the use-supplied end points. In general, within a level set framework, the moving front, denoted by C, is implicitly represented by the zero level of a higher dimensional function, $\phi$, that is: $C(t)=\{(x,y)|\phi(x,y)=0\}$. The level set function evolves according to the following equation, known as the level set equation:

$$\frac{\partial \phi}{\partial t} = F \cdot |\nabla \phi|,$$

where F is the speed function and depends on the image data and the level set function $\phi$.

Generally, the level set function $\phi$ is initialized as a signed distance function before the evolution, and then $\phi$ is periodically re-initialized during the course of evolution. The variational formulation proposed by Li, et al., forces the level set function to be close to a signed distance function, and then removes the costly re-initialization procedure. This was done by adding a new energy term, denoted by $P(\phi)$ to the energy functional $E(\phi)$, that would drive the motion of the evolving front towards the boundaries of the structure(s) to be segmented. The functional P is given by:

$$P(\phi) = \frac{1}{2} \int (|\nabla \phi| - 1)^2 d\Omega,$$

based on the fact that any function $\phi$ that satisfies $|\nabla \phi|=1$ is a signed distance function plus a constant. Since P is a function of $\phi$ only, it is considered an internal energy. The external energy $E_g$ that drives the zero level curve is given by:

$$E_g(\phi) = \alpha_2 \int_\Omega g\delta(\phi)|\nabla \phi| d\Omega + \alpha_3 \int_\Omega gH(-\phi)d\Omega,$$

where $\alpha_2>0$ and $\alpha_3$ are constants, and H( ) and $\delta$( ) denote the Heaviside function and its derivative, the Dirac delta function, respectively. The constant $\alpha_3$ can be positive or negative, depending on the relative position of the initial contour to the object of interest. For example, if the initial contours are placed outside the object, $\alpha_3$ in the weighted area term should take positive value, so that the contours can shrink faster. If the initial contours are placed inside the object, $\alpha_3$ should take negative value to speed up the expansion of the contours. The function g is an edge indicator function defined on the image, I, as $$g = \frac{1}{1+|\nabla G_\sigma * I|^2},$$

with $G_\sigma$ being a Gaussian kernel with standard deviation $\sigma I$. The total energy functional is:

$$E(\phi)=\alpha_1 P(\phi)+E_g(\phi),$$

where $\alpha_1>0$ is a parameter controlling the effect of penalizing the deviation of $\phi$ from the signed distance function. The external energy $E_g$ drives the zero level set toward the object boundaries, while the internal energy P penalizes the deviation of $\phi$ from the signed distance function during its evolution.

The resulting evolution system is given by:

$$\frac{\partial \phi}{\partial t} = \alpha_1 div\left(\left(1 - \frac{1}{|\nabla \phi|}\right)\nabla \phi\right) + \alpha_2 \delta(\phi) div\left(g\frac{\nabla \phi}{|\nabla \phi|}\right) + \alpha_3 g\delta(\phi),$$

which can be solved by means of gradient descent, for example.

This formulation offers useful numerical features, such as ease of implementation and the flexibility in initializing the level set function in a more efficient and less costly way compared to sign distance initializations.

According to an embodiment of the invention, if the structure to be segmented is always the same and the maximum diameter is also known or can be derived from the image data, an algorithm according to an embodiment of the invention will work without any user interaction and can provide a fully automatic segmentation if the start and end points can be automatically detected. A typical example for this scenario is the segmentation of the femoral bone. The head of the femur and the medial or lateral epicondyle are the landmarks that can be detected with known algorithms. The locations of those landmarks together with the maximum diameter of the femur, which is also known, are then passed to a segmentation algorithm according to an embodiment of the invention and a fully automatic segmentation is performed.

Figure 6:
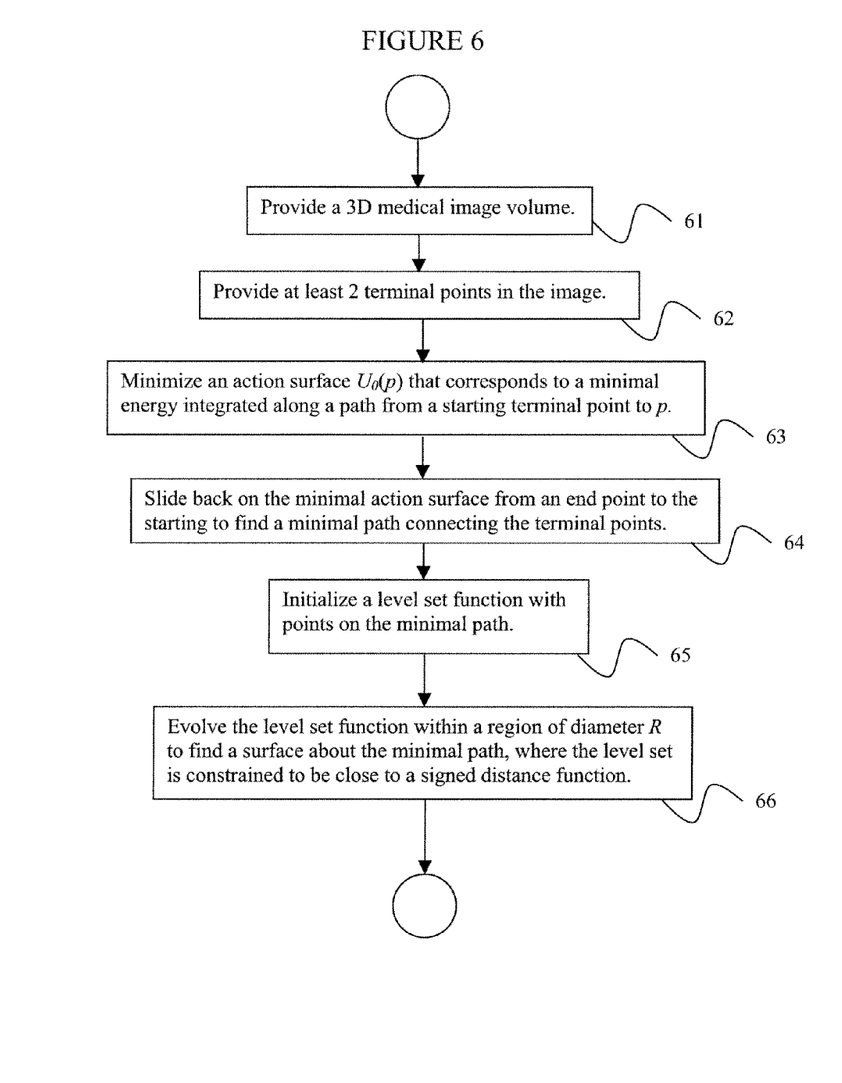
FIG. 6 is a flowchart of a method for segmenting tubular structures in digital medical images, according to an embodiment of the invention.

A flowchart of a method for segmenting tubular structures in digital medical images is presented in FIG. 6. Referring now to the figure, a method at step 61 starts by providing a 3-dimensional (3D) medical image volume, from which, at step 62, at least 2 terminal points are provided. At step 63, an action surface $U_0(p)$ which, at each image point p, corresponds to a minimal energy integrated along a path that starts at start point $p_0$ and ends at p, is minimized. The surface $U_0(p)$ is defined by $$U_0(p) = \inf_{C \in A_{P_0 P_1}} \{E(C)\},$$

where $$E(C) = \int_0^1 (w + P(C(s))) ds$$

is a real scalar function defined on a space of all curves C connecting the terminal points. Note that the $\|\partial C/\partial s\|$ can be dropped from the equation for E(C) as it has a value of unity.

The action can be minimized by solving the Eikonal equation $\|\nabla U_0\| = \tilde{P}$ with $U_0(p_0) = 0$ at the start point. At step 64, a minimal path connecting the terminal points is found by sliding back on the minimal action surface from $(p_1, U_0(p_1))$ to $(p_0, U_0(p_0))$ wherein $p_1$ is an end point. A level set function $\phi$ is initialized at step 65 with points on said minimal path. A zero level of the level set function is a moving front C defined by $C(t) = \{(x,y) | \phi(x,y) = 0\}$. At step 66, the level set function is evolved by solving $$\frac{\partial \phi}{\partial t} = \alpha_1 div\left(\left(1 - \frac{1}{|\nabla \phi|}\right)\nabla \phi\right) + \alpha_2 \delta(\phi) div\left(g\frac{\nabla \phi}{|\nabla \phi|}\right) + \alpha_3 g \delta(\phi)$$

in a region of the image of diameter R about the minimal path, where the level set function is prevented from growing wider than the predetermined diameter R, and the level set function is constrained by the first term on the right hand side of the evolution equation to be close to a signed distance function. The surface about the minimal path defines a tubular structure.

Results

As described above, a user picks at least two-end points, and possibly more (e.g., one start point and several different points along a path), and starts searching for paths. FIGS. 1(a)-(d) illustrates four examples of path searching and extraction for both synthetic and medical examples, according to an embodiment of the invention. Each pair of figures (a)-(b) shows the user-supplied start point 11, indicated by a square, the user supplied end point 12, indicated by an 'x', and the extracted path 13. A radius R is set by the user depending on the geometry of the portion of interest. A surface is built containing only those voxels that are within the distance R around the extracted path. This way, any leaks to surrounding tissues and bifurcations that may lie between the input end-points are minimized and can be efficiently controlled. The level set segmentation step is extremely fast since it is only applied to a small portion of the image around the object of interest as defined by the radius R.

Figure 1:
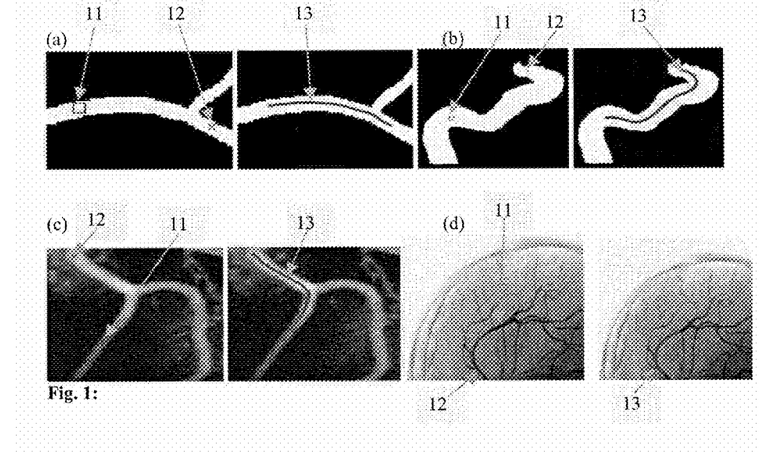
FIGS. 1(a)-(d) illustrates four examples of path searching and extraction for both synthetic and medical examples, according to an embodiment of the invention.
Figure 2:
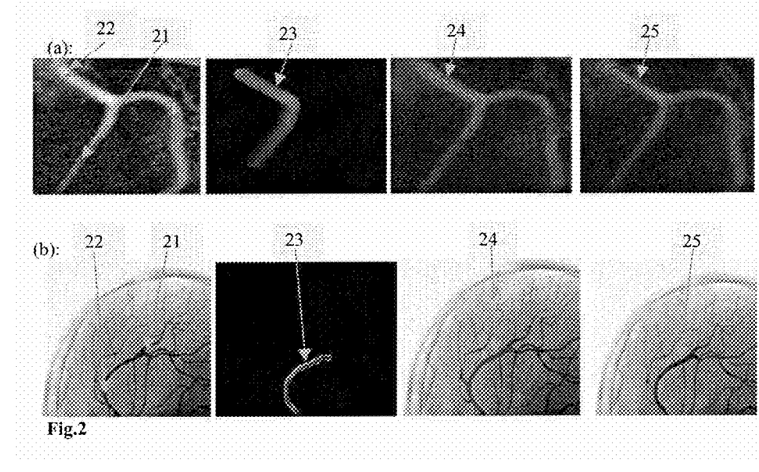
FIGS. 2(a)-(b) illustrate segmentation steps and results, according to an embodiment of the invention.

FIGS. 2(a)-(b) illustrate segmentation steps and results, according to an embodiment of the invention. The top row, FIG. 2(a), shows the steps for the example of FIG. 1(c), and the bottom row, FIG. 2(b), shows the steps for the example of FIG. 1(d). From left to right are shown: (1) the user supplied end-points 21, 22; (2) the surface 23 generated by those pixels that are within a radius R from the extracted path between the two end-points; (3) the level set initialization 24 as small circles centered on path points; and (4) the final segmentation result 25.

Figure 3:
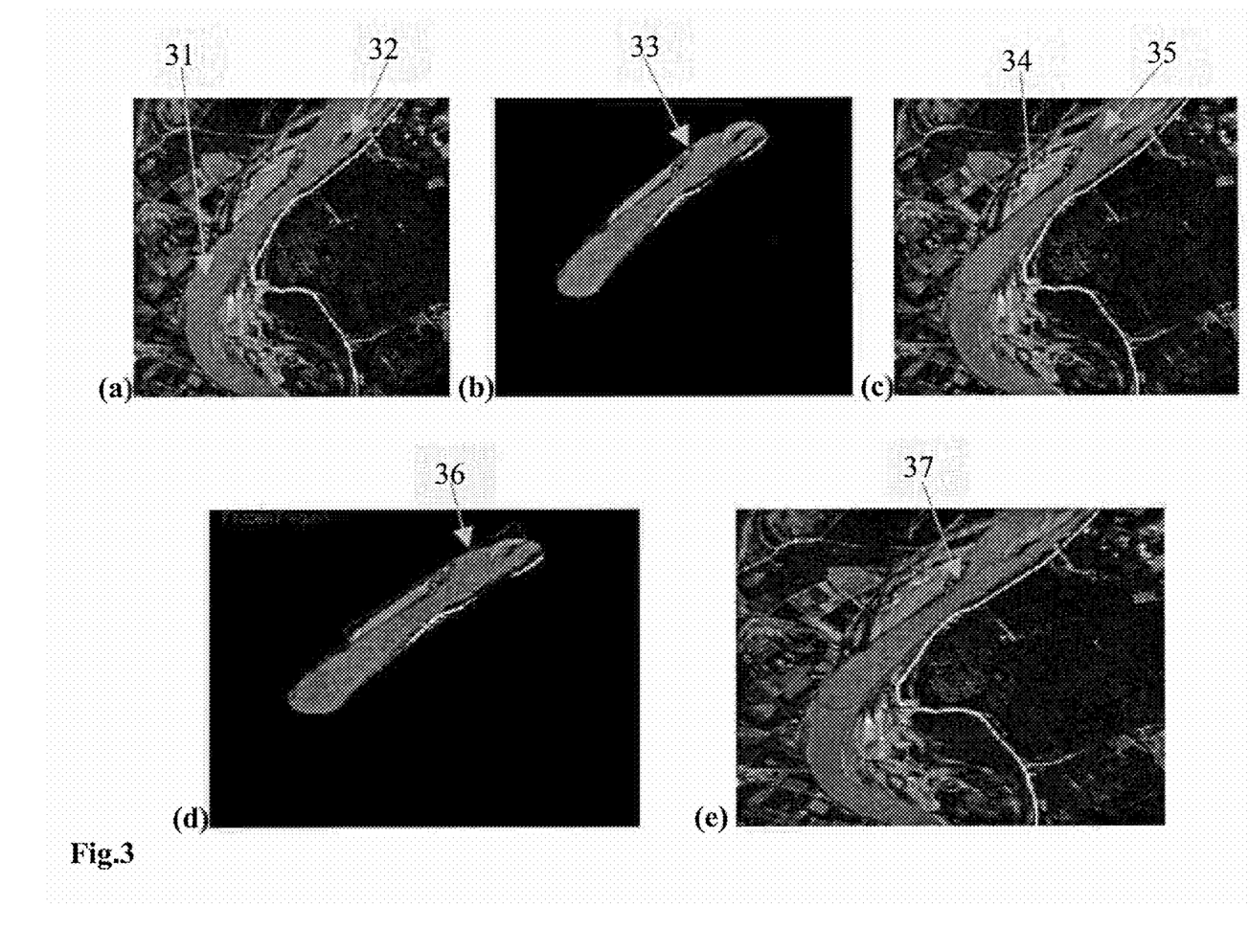
FIGS. 3(a)-(e) illustrate the control of leakage, according to an embodiment of the invention.

FIGS. 3(a)-(e) illustrate an example of leakage control where the evolving front leaks to a branch that lies between the input end-points, according to an embodiment of the invention. FIG. 3(a) depicts the user-supplied end points 31, 32. FIG. 3(b) shows the region 33 around the extracted path within a radius R. FIG. 3(c) shows the segmentation output 34 without constraining the leakage area, and the front leaks to a neighboring branch 35. To contain this leak, the user can click on few points to freeze a region of points around the leak area. FIG. 3(d) shows the region 36 to be frozen defined from a few clicks from the user. More than one such region can be interactively determined. Subsequently, the freezing mechanism is activated to remove the leaks. FIG. 3(e) shows the segmentation results 37 when running the freezing mechanism. The leaks observed in FIG. 3(c) are contained.

Figure 4:
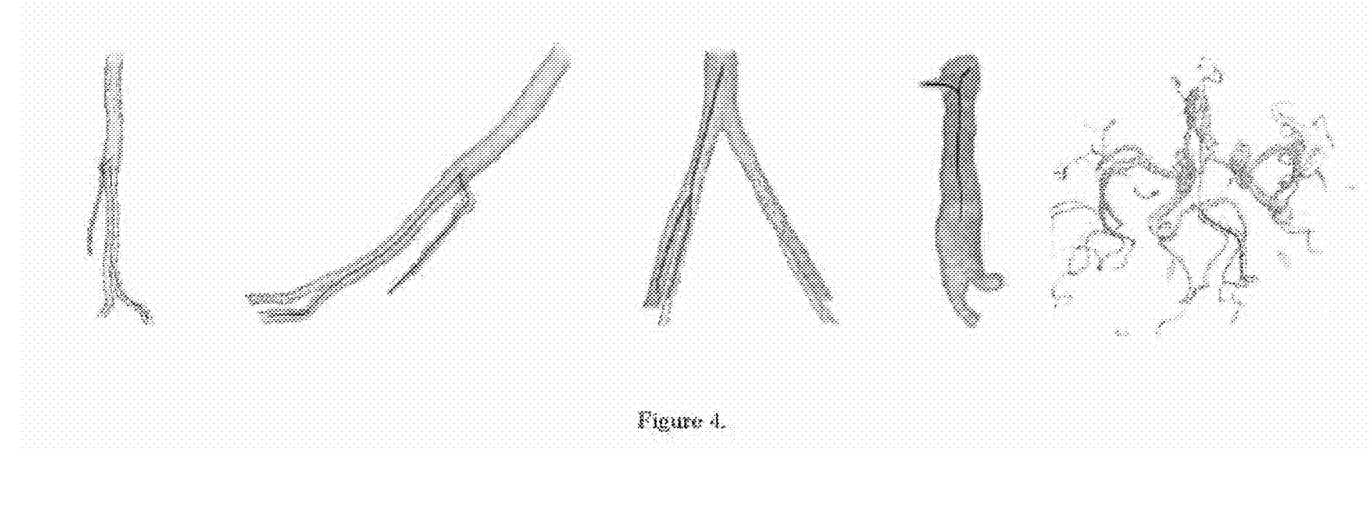
FIG. 4 shows three dimensional minimum path extraction for various three dimensional synthetic and real data sets, according to an embodiment of the invention.

Further results are depicts in FIG. 4, which shows three dimensional minimum path extraction for various three dimensional synthetic and real data sets between two or more user-supplied end points.

Figure 5:
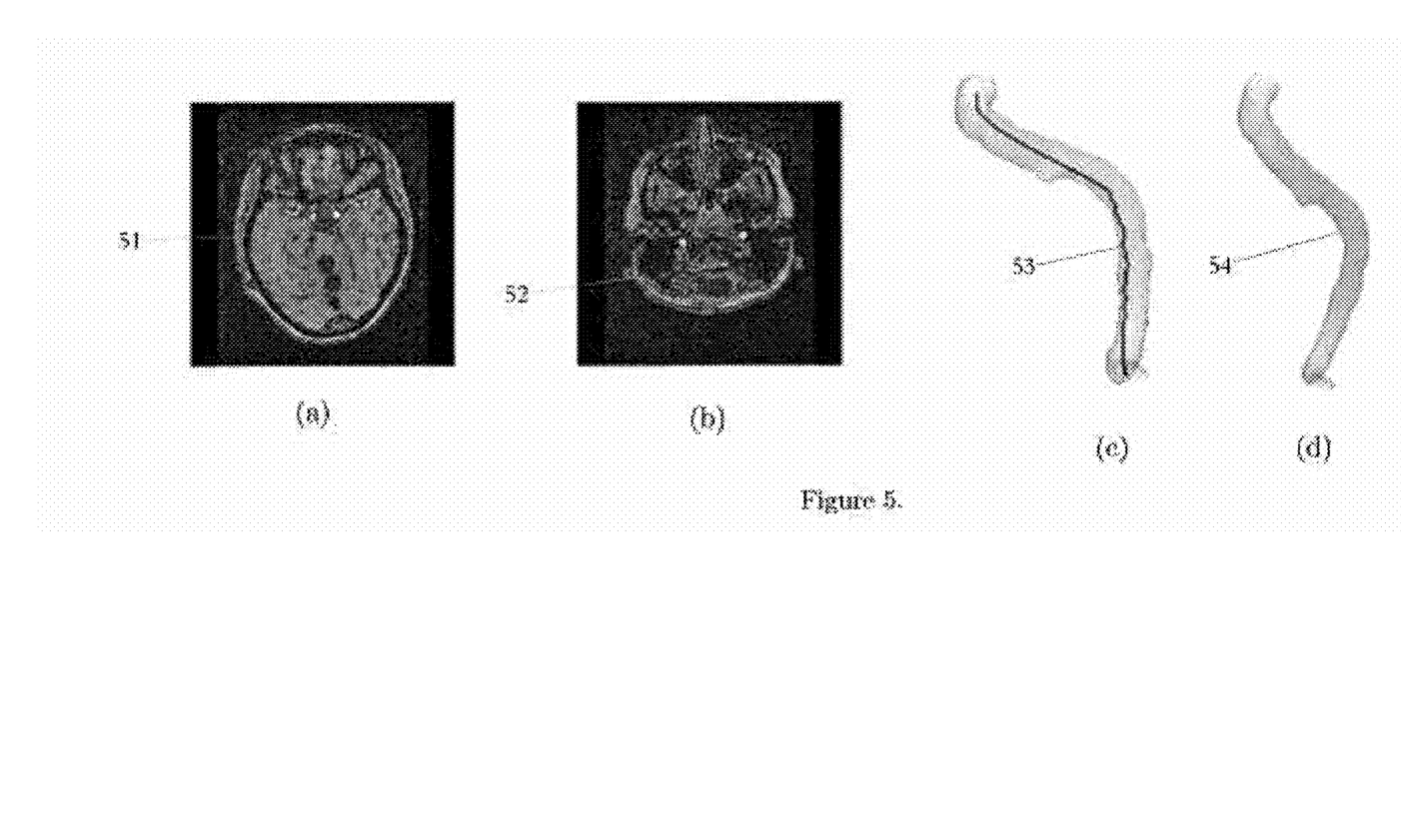
FIGS. 5(a)-(d) depicts the segmentation result of a part of the vasculature tree from the MRA volume, according to an embodiment of the invention.

Finally, an algorithm according to an embodiment of the invention was used to segment the blood vessel surface lying between two points selected by the user in a Magnetic Resonance Angiography (MRA) data set of size 512×512×93. FIGS. 5(a)-(d) depicts the segmentation result of a part of the vasculature tree from the MRA volume. FIGS. 5(a)-(b) show the end-points 51, 52 selected by the user, while FIGS. 5(c-d) show the extracted path 53 and segmented vessel surface 54. For this example, the start and end point are selected on slice 58 and slice 88 respectively as shown on FIG. 5(a)-(b). The 3D extracted path serves to generate a volume within a radius R around the extracted path. This volume is then segmented and the surface of interest is segmented as shown on FIG. 5(c)-(d).

System Implementations

It is to be understood that embodiments of the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 7:
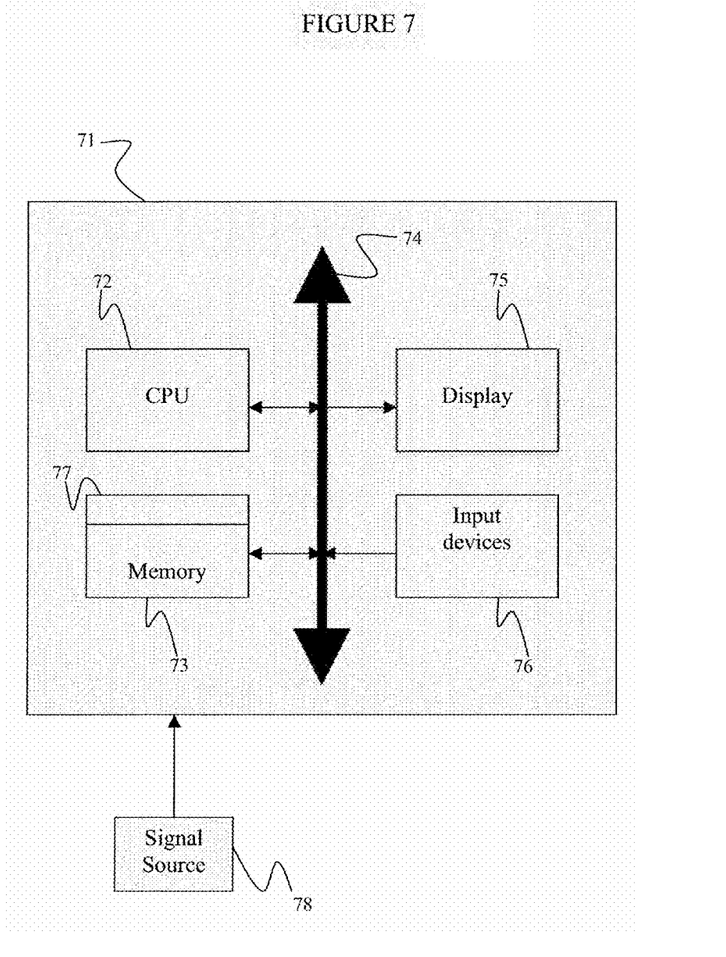
FIG. 7 is a block diagram of an exemplary computer system for implementing a method for segmenting tubular structures in digital medical images, according to an embodiment of the invention.

FIG. 7 is a block diagram of an exemplary computer system for implementing a method for segmenting tubular structures in digital medical images according to an embodiment of the invention. Referring now to FIG. 7, a computer system 71 for implementing the present invention can comprise, inter alia, a central processing unit (CPU) 72, a memory 73 and an input/output (I/O) interface 74. The computer system 71 is generally coupled through the I/O interface 74 to a display 75 and various input devices 76 such as a mouse and a keyboard. The support circuits can include circuits such as cache, power supplies, clock circuits, and a communication bus. The memory 73 can include random access memory (RAM), read only memory (ROM), disk drive, tape drive, etc., or a combinations thereof. The present invention can be implemented as a routine 77 that is stored in memory 73 and executed by the CPU 72 to process the signal from the signal source 78. As such, the computer system 71 is a general purpose computer system that becomes a specific purpose computer system when executing the routine 77 of the present invention.

The computer system 71 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been described in detail with reference to a preferred embodiment, those skilled in the art will appreciate that various modifications and substitutions can be made thereto without departing from the spirit and scope of the invention as set forth in the appended claims.

What is claimed is:

1. A method for segmenting tubular structures in medical images comprising the steps of:
providing a 3-dimensional (3D) medical image volume, said image volume comprising a plurality of intensities associated with a 3D grid of points;
providing at least 2 terminal points in said image, including a start point and an end point;
minimizing an action surface $U_0(p)$ which, at each image point p, corresponds to a minimal energy integrated along a path that starts at start point $p_0$ and ends at p;
sliding back on said minimal action surface from $(p_1, U_0(p_1))$ to $(p_0, U_0(p_0))$ wherein $p_1$ is an end point to find a minimal path connecting said terminal points;
initializing a level set function with points on said minimal path; and
evolving said level set function to find a surface of a structure about said minimal path, wherein said level set function is constrained to be close to a signed distance function and wherein said level set function is prevented from growing wider than a predetermined diameter R,
wherein said surface about said minimal path defines a tubular structure.

2. The method of claim 1, wherein said surface $U_0(p)$ is defined by $$U_0(p) = \inf_{C \in A_{p_0 p_1}} \{E(C)\},$$

wherein $$E(C) = \int_0^1 (w + P(C(s))) ds$$

is a real scalar function defined on a space of all curves C connecting said terminal points, wherein s is an arc length along a path, w is a predetermined positive real constant and P is an image feature attraction potential function.

3. The method of claim 2, further comprising extracting an edge map from said image, wherein said potential function P at each point p in said image is an increasing function of the shortest Euclidean distance to a point in said edge map.

4. The method of claim 1, wherein minimizing an action surface $U_0(p)$ comprises solving an Eikonal equation $\|\nabla U_0\| = \tilde{P}$ with $U_0(p_0) = 0$ at the start point wherein $\tilde{P}(p) = w + P(p)$.

5. The method of claim 4, wherein said Eikonal equation is solved by a fast marching method wherein U at a given image point (i,j,k) is given as the solution of $(u - \min\{U_{i-1,j,k}, U_{i+1,j,k}\})^2 + (u - \min\{U_{i,j-1,k}, U_{i,j+1,k}\})^2 + (u - \min\{U_{i,j,k-1}, U_{i,j,k+1}\})^2 = \tilde{P}^2(i,j,k)$ where $u = U_{i,j,k}$.

6. The method of claim 1, wherein sliding back on said minimal action surface comprises numerically solving $$\frac{\partial C}{\partial \sigma} = -\nabla U_0,$$

$C(0) = p_1$, wherein starts an end point $p_1$ and $\sigma$ is an arc length parameter.

7. The method of claim 1, wherein evolving said level set function comprises solving $$\frac{\partial \phi}{\partial t} = \alpha_1 div\left(\left(1 - \frac{1}{|\nabla \phi|}\right)\nabla \phi\right) + \alpha_2 \delta(\phi) div\left(g \frac{\nabla \phi}{|\nabla \phi|}\right) + \alpha_3 g \delta(\phi)$$

in a region of said image about said minimal path, wherein $\phi$ is said level set function whose zero level is a moving front C defined by $C(t) = \{(x,y) | \phi(x,y) = 0\}$, g is an edge indicator function defined on the image I as $$g = \frac{1}{1 + |\nabla G_\sigma * I|^2},$$

with $G_\sigma$ being a Gaussian kernel with standard deviation $\sigma$, $\delta(\ )$ is a Dirac delta function, and $\alpha_1, \alpha_2 > 0$ and $\alpha_3$ are constants, wherein said first term on the right hand side of the equation for $$\frac{\partial \phi}{\partial t}$$

penalizes a deviation of $\phi$ from a signed distance function during evolution of $\phi$.

8. The method of claim 1, further comprising, if an evolving front leaks outside of a region of interest, providing one or more points that specify a region in which a speed of said level set evolution is zero.

9. A method for segmenting tubular structures in medical images comprising the steps of:
providing a 3-dimensional (3D) medical image volume, said image volume comprising a plurality of intensities associated with a 3D grid of points;
extracting a path between user supplied end points that globally minimizes an active contour model's energy along all possible paths joining said end points;
initializing a level set function $\phi$ with points on said minimal path, wherein a zero level of said level set function is a moving front C defined by $C(t) = \{(x,y) | \phi(x,y) = 0\}$; and
evolving said level set function to find a surface of a structure about said minimal path by solving $$\frac{\partial \phi}{\partial t} = \alpha_1 div\left(\left(1 - \frac{1}{|\nabla \phi|}\right)\nabla \phi\right) + \alpha_2 \delta(\phi) div\left(g \frac{\nabla \phi}{|\nabla \phi|}\right) + \alpha_3 g \delta(\phi)$$

in a region of said image about said minimal path, wherein g is an edge indicator function defined on the image I as $$g = \frac{1}{1 + |\nabla G_\sigma * I|^2},$$

with $G_\sigma$ being a Gaussian kernel with standard deviation $\sigma$, $\delta(\ )$ is a Dirac delta function, and $\alpha_1, \alpha_2 > 0$ and $\alpha_3$ are constants, wherein said level set function is prevented from growing wider than a predetermined diameter R,
wherein said surface about said minimal path defines a tubular structure.

10. The method of claim 9, wherein said first term on the right hand side of the equation for $$\frac{\partial \phi}{\partial t}$$

penalizes a deviation of φ from a signed distance function during evolution of φ.

11. The method of claim 9, wherein extracting a path between user supplied end points comprises:
providing at least 2 terminal points in said image, including a start point and an end point;
minimizing an action surface $U_0(p)$ which, at each image point p, corresponds to a minimal energy integrated along a path that starts at start point $p_0$ and ends at p; and
sliding back on said minimal action surface from $(p_1, U_0(p_1))$ to $(p_1, U_0(p_0))$ wherein $p_1$ is an end point to find a minimal path connecting said terminal points.

12. The method of claim 11, wherein the end points are provided by a user.

13. The method of claim 11, wherein the end points are automatically provided.

14. A program storage device readable by a computer, tangibly embodying a program of instructions executable by the computer to perform the method steps for segmenting tubular structures in medical images, said method comprising the steps of:
providing a 3-dimensional (3D) medical image volume, said image volume comprising a plurality of intensities associated with a 3D grid of points;
providing at least 2 terminal points in said image, including a start point and an end point;
minimizing an action surface $U_0(p)$ which, at each image point p, corresponds to a minimal energy integrated along a path that starts at start point $p_0$ and ends at p;
sliding back on said minimal action surface from $(p_1, U_0(p_1))$ to $(p_0, U_0(p_0))$ wherein $p_1$ is an end point to find a minimal path connecting said terminal points;
initializing a level set function with points on said minimal path; and
evolving said level set function to find a surface of a structure about said minimal path, wherein said level set function is constrained to be close to a signed distance function and wherein said level set function is prevented from growing wider than a predetermined diameter R,
wherein said surface about said minimal path defines a tubular structure.

15. The computer readable program storage device of claim 14, wherein said surface $U_0(p)$ is defined by $$U_0(p) = \inf_{C \in A_{p_0 p_1}} \{E(C)\},$$

wherein $$E(C) = \int_0^1 (w + P(C(s))) ds$$

is a real scalar function defined on a space of all curves C connecting said terminal points, wherein s is an arc length along a path, w is a predetermined positive real constant and P is an image feature attraction potential function.

16. The computer readable program storage device of claim 15, the method further comprising extracting an edge map from said image, wherein said potential function P at each point p in said image is an increasing function of the shortest Euclidean distance to a point in said edge map.

17. The computer readable program storage device of claim 14, wherein minimizing an action surface $U_0(p)$ comprises solving an Eikonal equation $\|\nabla U_0\| = \tilde{P}$ with $U_0(p_0) = 0$ at the start point wherein $\tilde{P}(p) = w + P(p)$.

18. The computer readable program storage device of claim 17, wherein said Eikonal equation is solved by a fast marching method wherein U at a given image point (i,j,k) is given as the solution of $(u - \min\{U_{i-1,j,k}, U_{i+1,j,k}\})^2 + (u - \min\{U_{i,j-1,k}, U_{i,j+1,k}\})^2 + (u - \min\{U_{i,j,k-1}, U_{i,j,k+1}\})^2 = \tilde{P}^2(i,j,k)$ where $u = U_{i,j,k}$.

19. The computer readable program storage device of claim 14, wherein sliding back on said minimal action surface comprises numerically solving $$\frac{\partial C}{\partial \sigma} = -\nabla U_0,$$

$C(0) = p_1$, wherein C starts at an end point $p_1$ and σ is an arc length parameter.

20. The computer readable program storage device of claim 14, wherein evolving said level set function comprises solving $$\frac{\partial \phi}{\partial t} = \alpha_1 div\left(\left(1 - \frac{1}{|\nabla \phi|}\right)\nabla \phi\right) + \alpha_2 \delta(\phi) div\left(g\frac{\nabla \phi}{|\nabla \phi|}\right) + \alpha_3 g\delta(\phi)$$

in a region of said image about said minimal path, wherein φ is said level set function whose zero level is a moving front C defined by $C(t) = \{(x,y) | \phi(x,y) = 0\}$, g is an edge indicator function defined on the image I as $$g = \frac{1}{1 + |\nabla G_\sigma * I|^2},$$

with $G_\sigma$ being a Gaussian kernel with standard deviation σ, δ( ) is a Dirac delta function, and $\alpha_1, \alpha_2 > 0$ and $\alpha_3$ are constants, wherein said first term on the right hand side of the equation for $$\frac{\partial \phi}{\partial t}$$

penalizes a deviation of φ from a signed distance function during evolution of φ.

21. The computer readable program storage device of claim 14, the method further comprising, if an evolving front leaks outside of a region of interest, providing one or more points that specify a region in which a speed of said level set evolution is zero.

* * * * *